E. BIXLER.
AUTOMATIC AIR BRAKE COUPLING.
APPLICATION FILED FEB. 2, 1912.
1,031,617.
Patented July 2, 1912.
2 SHEETS—SHEET 1.
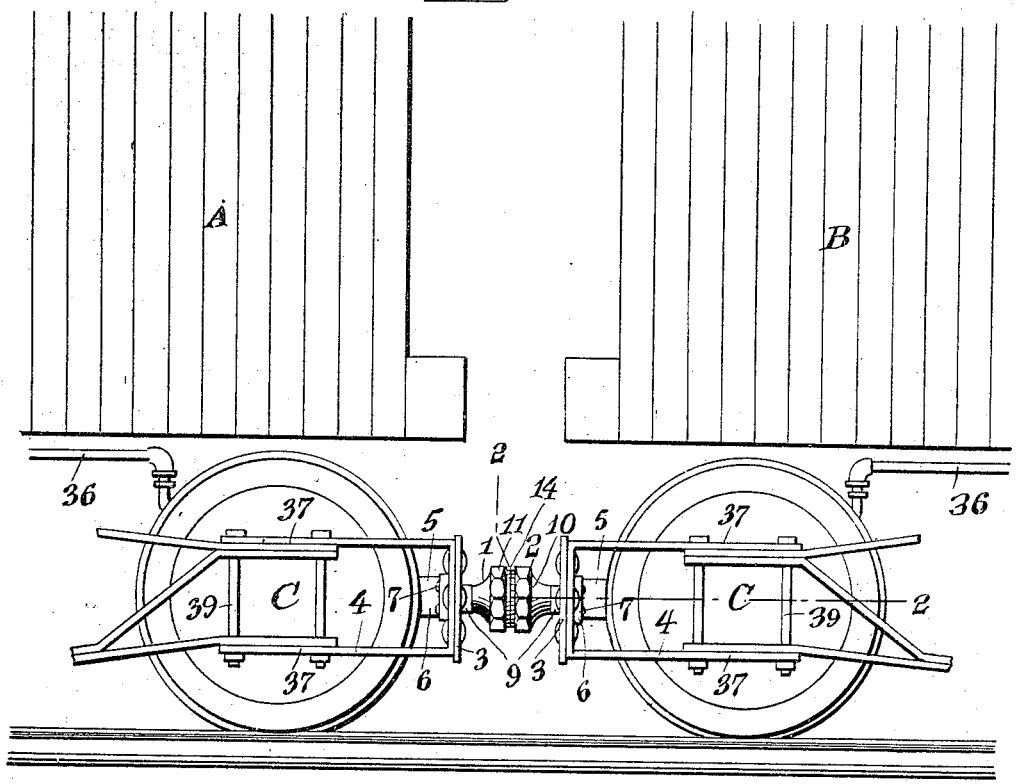
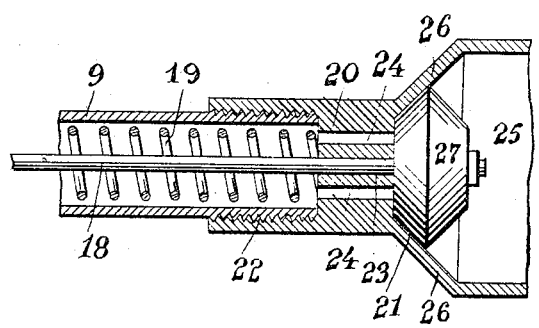
Inventor
Eli Bixler
By Victor J. Evans
Attorney
Witnesses

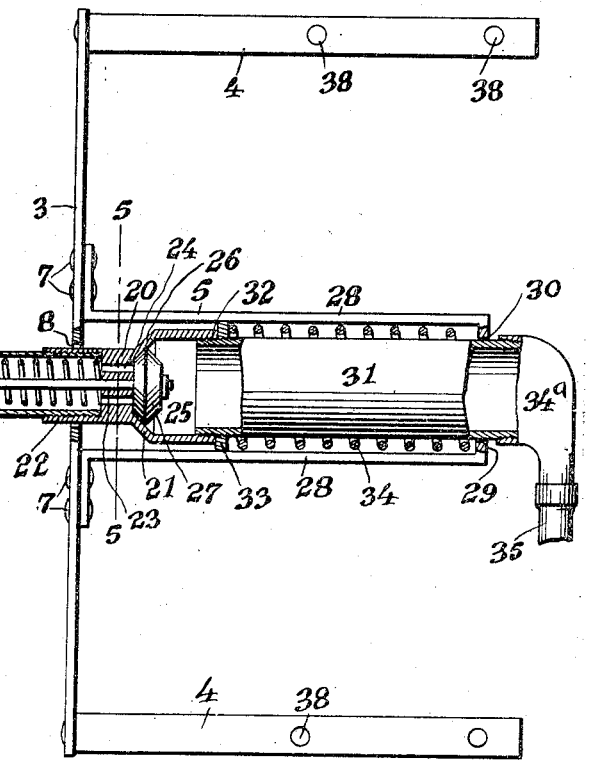

UNITED STATES PATENT OFFICE.

ELI BIXLER, OF BERNE, INDIANA.

AUTOMATIC AIR-BRAKE COUPLING.

1,031,617.  Specification of Letters Patent.  Patented July 2, 1912.

Application filed February 2, 1912. Serial No. 674,971.

*To all whom it may concern:*

Be it known that I, ELI BIXLER, a citizen of the United States, residing at Berne, in the county of Adams and State of Indiana, have invented new and useful Improvements in Automatic Air-Brake Couplings, of which the following is a specification.

This invention relates to automatic air brake couplings, and has for an object to provide a coupling which will include companion coupling members which are adapted to be secured to adjacent cars to automatically engage each other when the cars are moved to coupled positions, whereby the automatic communication between the air line pipes of the adjacent cars can be established.

A still further object of the invention is to provide means for yieldingly maintaining the coupling elements in coupling positions to insure their positive engagement with each other on coupling of the cars.

In the drawings, forming a portion of this specification and in which like numerals of reference indicate similar parts in the several views:—Figure 1 is a side view showing adjacent cars in their coupled positions and provided with my improved coupling. Fig. 2 is a horizontal section taken on line 2—2 of Fig. 1. Fig. 3 is section through one of the couplings showing the valve in a closed position. Fig. 4 is a section on line 4—4 of Fig. 2. Fig. 5 is a section on line 5—5 of Fig. 2.

The cars A and B are provided with identically constructed couplings 1 and 2 each of which including a horizontal guide member 3, the side U-brackets 4 and the intermediate U-brackets 5, the latter having forwardly disposed flanges 6 which are secured at 7 to the guide member 3.

The guide member 3 of each coupling is provided thereon with a central guide opening 8 in which the valve casing 9 is slidingly mounted. This casing is provided at its outer end with a coupling head 10 to which is threadedly connected a collar 11. This collar is provided with a flange 12 which is adapted to engage against the wall 13 of the gasket 14 so as to hold the gasket securely applied to the head. The head is provided interiorly with a substantially disk like portion 13ª in which is formed an annular series of openings 15 and a central guide opening 16, the latter being designed to receive therein the sliding valve stem 16ª.

The valve rod is connected detachably at 17 with the section 18 of the valve rod and as shown the connection 17 forms a stop against which one end of an extensile spring 19 bears, the opposite end of said spring being seated against the head 20 of the valve seat 21. This valve seat is provided with an interiorly threaded socket 22 which receives one end of the casing 9. A central opening 23 in the head 20 forms a guide for the section 18 of the valve stem. The head 20 is provided with an annular series of passages 24 which open forwardly into the casing 9, the rear ends of the said openings being in communication with the chamber 25 of the valve seat member. The walls of the valve seat member are flared outwardly at 26 and as shown the valve 27 is correspondingly flared so as to be snugly hugged by the walls 26 to insure a perfect air tight connection between the valve and the seat forming member when the former is closed under the action of the spring 19. Rearwardly of the flared walls 26, the walls of the chamber 25 are disposed in parallel relation and at this point the diameter of the chamber is considerably larger than the valve 27 so that when the valve is opened communication is established between the valve chamber and the casing 9.

The side arms 28 of the bracket 5 of each coupling member are connected at their inner ends by a branch portion 29 which has formed therein a guide opening 30 which is located in line with the opening 8 in the guide member 3. The opening 30 has extended therethrough a conduit 31, the major portion of which being extended into the space between the side arms 28, and as shown its forward end is threadedly connected with the member 20 at 32. A jam nut 33 is adjustably mounted on the forward end of the conduit and it may be brought into engagement with the walls of the chamber 25 as shown. An extensile spring 34 encircles the conduit and as illustrated the front end of the spring bears against the nut 33, so that under the action of the spring the coupling head 10 is maintained in coupling position. The rear end of the conduit is provided with an elbow or nipple 34ª which is connected by the flexible hose 35 to the train line pipe 36. The outer ends of the valve rods 16 of the couplings are provided with relatively broad contact heads 36ª, the head of one coupling being designed to engage against the head of the adjacent coupling when the adjacent cars come together. Now, it is seen that the outer ends of the rods 16 extending slightly beyond the heads 10 and when the cars are coupled the valves 27 will be simultaneously opened so that continuous communication is established between the train line pipes of the adjacent cars. Brackets 4 are provided with arms 37 which embrace the end portions of the trucks C of the cars, the arms being apertured at 38, and as shown bolts 39 extend through the apertures and through the truck bars whereby the couplings are held securely applied as is understood.

I claim:—

The combination with a car, of an air coupling comprising a guide member having brackets of U-form embracing the truck of the car, bolts extending through the brackets and through the truck to hold the coupling in its applied position thereon, a substantially U-member secured to the guide member and provided with longitudinal arms and a connecting branch portion, a conduit slidable through the branch portion and disposed between the said longitudinal arms, a seat forming member connected to the forward end of the conduit, an extensile spring embracing the conduit and interposed between the said branch portion and the said seat forming element, the said seat forming element having an apertured head thereon, a casing detachably connected with the said apertured head, a valve rod slidably mounted in the casing and provided with a valve inwardly of the said apertured head, a spring operatively connected with the valve rod to hold the valve yieldingly against the said apertured head, a head at the outer end of the casing, and a head formed on the valve rod and extending normally beyond the head on said casing for the purpose specified.

In testimony whereof I affix my signature in presence of two witnesses.

ELI BIXLER.

Witnesses:
   WILLIAM T. WAGGONER,
   DANIEL A. MILLER.